(12) United States Patent
Fujii

(10) Patent No.: US 11,842,232 B2
(45) Date of Patent: Dec. 12, 2023

(54) RFID DATA COLLECTING DEVICE, AND RFID DATA COLLECTION SYSTEM

(71) Applicant: PHOENIX SOLUTION CO., LTD., Kanazawa (JP)

(72) Inventor: Masakazu Fujii, Kanazawa (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 0 days.

(21) Appl. No.: 17/618,050

(22) PCT Filed: Feb. 8, 2021

(86) PCT No.: PCT/JP2021/004516
§ 371 (c)(1),
(2) Date: Dec. 10, 2021

(87) PCT Pub. No.: WO2021/205739
PCT Pub. Date: Oct. 14, 2021

(65) Prior Publication Data
US 2023/0274107 A1   Aug. 31, 2023

(30) Foreign Application Priority Data
Apr. 9, 2020   (JP) ................. 2020-070216

(51) Int. Cl.
*G06K 7/10* (2006.01)
*H04B 5/02* (2006.01)
(Continued)

(52) U.S. Cl.
CPC ....... *G06K 7/10297* (2013.01); *H01Q 9/0421* (2013.01); *H01Q 21/24* (2013.01); *H04B 5/02* (2013.01)

(58) Field of Classification Search
CPC .. G06K 7/10297; H01Q 9/0421; H01Q 21/24; H04B 5/02
See application file for complete search history.

(56) References Cited

U.S. PATENT DOCUMENTS

2011/0309931 A1* 12/2011 Rose ............... G06Q 10/08
340/572.1

FOREIGN PATENT DOCUMENTS

| JP | 2004-199226 A | 7/2004 |
|---|---|---|
| JP | 2005-202541 A | 7/2005 |

(Continued)

OTHER PUBLICATIONS

International Search Report for PCT/JP2021/004516 dated Apr. 27, 2021.

*Primary Examiner* — Laura A Gudorf
(74) *Attorney, Agent, or Firm* — PEARNE & GORDON LLP

(57) ABSTRACT

To provide a safe RFID data collecting device and an RFID data collection system with which there is no leakage of information being written to an RFID tag or information being read from the RFID tag, even if communication with the RFID tag is intercepted. This RFID data collecting device includes an RFID reader 10, a wired and wireless LAN connecting unit 20, a portable telephone communication unit 30, and a system control unit 40 including a processor 41 and a memory 42, wherein: the system control unit 40 is provided with a common key system encryption/decryption function; data written to an RFID tag 80 are encrypted before being written; data read from the RFID tag 80 are decrypted after being read; and a common key for encryption/decryption is saved in a SIM card 32 provided in the portable telephone communication unit.

6 Claims, 6 Drawing Sheets

(51) Int. Cl.
*H01Q 21/24* (2006.01)
*H01Q 9/04* (2006.01)

(56) References Cited

FOREIGN PATENT DOCUMENTS

| | | |
|---|---|---|
| JP | 2008-542944 A | 11/2008 |
| JP | 2009-159240 A | 7/2009 |
| JP | 2014-142821 A | 8/2014 |
| JP | 2018-117285 A | 7/2018 |
| JP | 2019-164529 A | 9/2019 |

* cited by examiner

RFID DATA COLLECTING DEVICE, AND RFID DATA COLLECTION SYSTEM

TECHNICAL FIELD

The present invention relates to an RFID data collecting device and an RFID data collection system.

For example, Patent Literature 1 (Japanese Translation of PCT International Application Publication No. 2008-542944) discloses a method and a system for safe RFID system communication.

According to the method and the system for safe RFID system communication described in Patent Literature 1 (Japanese Translation of PCT International Application Publication No. 2008-542944), an RFID reader transmits a write request to an RFID tag. The RFID tag generates random data and transmits the random data to the RFID reader. The RFID system encrypts information using the random data and the RFID reader transmits the encrypted information to the RFID tag that decrypts the information using the random data. Lastly, the RFID tag stores the decrypted information in a memory of the RFID tag.

Patent Literature 2 (Japanese Patent Laid-Open No. 2004-199226) discloses a reader/writer antenna and an RFID system provided with the antenna that can reduce non-communicable areas, carry out stable communication with a tag and reduce influences on equipments installed near the antenna.

According to the reader/writer antenna and the RFID system provided with the antenna described in Patent Literature 2 (Japanese Patent Laid-Open No. 2004-199226), each of a plurality of loop antennas in the reader/writer antenna constructed of the plurality of loop antennas is placed next to at least one of the other loop antennas and currents supplied to at least two adjacent loop antennas have different phases.

Patent Literature 3 (Japanese Patent Laid-Open No. 2009-159240) discloses an antenna to be incorporated in a housing of label printer and so on and the label printer using the antenna. The antenna can perform reliable wireless communication to only one predetermined wireless IC tag at the same time when carrying out bidirectional communication to the wireless IC tag inside the housing.

The antenna to be incorporated in a housing described in Patent Literature 3 (Japanese Patent Laid-Open No. 2009-159240) is an antenna placed in a housing connected to an RFID reader that contactlessly reads and writes information stored in a storage region of a wireless IC tag through bidirectional wireless communication, the antenna is a horn antenna and the horn antenna is characterized by including a feeding element, a metal body having a horn shape and a dielectric filled inside the horn shape of the metal body.

Patent Literature 4 (Japanese Patent Laid-Open No. 2019-164529) discloses a read control system that can improve reading performance for an RFID tag and prevent a processing capability on a conveyance line from deteriorating.

The read control system described in Patent Literature 4 (Japanese Patent Laid-Open No. 2019-164529) is the read control system provided with an RFID reader to which a plurality of antenna groups are connected for each antenna group and a read control apparatus that controls each RFID reader. Each antenna group is placed at a predetermined interval so as not to interfere with each other on the conveyance line, antennas included in the antenna group are arranged in different directions for each RFID reader, each RFID reader reads an RFID tag included in an object to be conveyed on the conveyance line, and the read control apparatus performs control to simultaneously read the RFID tags included in the conveyed objects in such a way that the antenna groups connected to each RFID reader are placed at predetermined intervals so as to prevent mutual wireless interference.

CITATION LIST

Patent Literature

Patent Literature 1: Japanese Translation of PCT International Application Publication No. 2008-542944
Patent Literature 2: Japanese Patent Laid-Open No. 2004-199226
Patent Literature 3: Japanese Patent Laid-Open No. 2009-159240
Patent Literature 4: Japanese Patent Laid-Open No. 2019-164529

SUMMARY OF INVENTION

Technical Problem

As a range of fields such as manufacturing sites, retail stores or warehouses in which RFIDs are used expands, there is a growing demand for an RFID data collecting device and an RFID data collection system capable of safely, reliably and easily collecting a lot of RFID data.

From the standpoint of safety, even in the case where communication information between the RFID reader and the RFID tag is intercepted, the information also needs to be encrypted in order to prevent information written to the RFID or information read from the RFID from being stolen.

Moreover, from the standpoint of reliability, it is necessary to improve directivity of an antenna of the RFID data collecting device in order to reliably communicate with an RFID tag of the communicating party and avoid interference from RFID tags other than that of the communicating party.

In addition, to collect data of more RFID tags, the RFID reader is preferably provided with a plurality of antennas.

To collect data still more easily, it is preferable that the RFID data collecting device is not only connected to a personal computer via a wired/wireless LAN but also connected to a portable information terminal via a wireless LAN and/or a portable telephone communication channel. And they constitute an RFID data collection system.

According to the method and system for safe RFID system communication described in Patent Literature 1, communication between the RFID tag and the RFID reader is carried out using encrypted information. However, since a key for encryption is sent from the RFID tag to the RFID reader first, if communication between the RFID tag and the RFID reader is consecutively intercepted, the key sent from the RFID tag to the RFID reader is intercepted first, and the encrypted information is then intercepted, whereby the encrypted information between the RFID tag and the RFID reader may be decrypted by an interceptor.

The reader/writer antenna described in Patent Literature 2 is provided with a plurality of loop antennas and phases of the respective loop antennas need to be adjusted among them, which may result in a problem that a configuration of antennas and peripheral circuits becomes complicated.

The antenna to be incorporated in a housing described in Patent Literature 3 needs to be provided with a horn-shaped metal body, which still results in a problem of the configuration becoming complicated.

For example, four antennas are connected to the RFID reader described in Patent Literature 4, and to detect movement of one RFID tag, the RFID reader uses the four antennas for time-shared transmission and reception, and the RFID reader with a single antenna cannot communicate with a plurality of RFID tags.

An objective of the present invention is to provide a safe RFID data collecting device and an RFID data collection system that prevent information written to an RFID tag or information read from an RFID tag from leaking even if communication with the RFID tag is intercepted.

A second objective of the present invention is to provide an RFID data collecting device and an RFID data collection system provided with high directivity that can reliably communicate with an RFID tag of a communicating party and prevent interference from RFID tags other than that of the communicating party.

A third objective of the present invention is to provide an RFID data collecting device and an RFID data collection system connected to a plurality of antennas and capable of easily collecting and utilizing data of a lot of RFID tags.

Solution to Problem (1)

An RFID data collecting device according to one aspect includes an RFID reader provided with a plurality of ports, one or a plurality of antennas connected to the plurality of ports, a wired/wireless LAN connection unit, a portable telephone communication unit and a system control unit including a processor, in which the system control unit writes data to an RFID tag and reads data from the RFID tag via the RFID reader by remote control, the system control unit is provided with an encryption/decryption function according to a common key scheme, the data written to the RFID tag is encrypted before being written, the data read from the RFID tag is decrypted after being read, and the common key for encryption/decryption is saved in a SIM card provided in the portable telephone communication unit.

As the range of fields such as manufacturing sites, retail stores or warehouses in which RFIDs are used expands, there is a growing demand for an RFID data collecting device and an RFID data collection system capable of safely and easily collecting a lot of RFID data.

An RFID data collecting device according to one aspect provides effects:
  (A) that the RFID reader provided with a plurality of ports for connection with the plurality of antennas can communicate with a plurality of RFID tags,
  (B) that the ability to communicate with a personal computer, a portable information terminal or the like through a variety of channels such as a wired/wireless LAN or a portable telephone communication channel allows to write data to the RFID tag or to read data from the RFID tag by remote control from the personal computer, the portable information terminal or the like.
  (C) that even in the case where communication information between the RFID reader and the RFID tag is intercepted, the ability to encrypt communication information between the RFID reader and the RFID tag prevents information written to the RFID and information read from the RFID from being stolen,
  (D) that saving the encryption key in the SIM card and thereby strictly guarding the SIM card allows to prevent, for example, even in the case where the RFID data collecting device is stolen, the encryption key from going into the hands of others, and to read the recorded data of the SIM card using another RFID data collecting device.

(2)

An RFID data collecting device according to a second invention is the RFID data collecting device according to the one aspect, in which the plurality of antennas are planar inverted-F antennas, arranged on the same plane at a predetermined relative angle to each other, and the RFID reader may transmit the same signals from the plurality of antennas connected to the plurality of ports simultaneously or at the same timing when transmitting radio waves, and may add and combine received signals of the plurality of antennas when receiving radio waves.

Examples of the transmission/reception method using the plurality of antennas include an array antenna or an adaptive array antenna. In this case, although advantageous effects are obtained that it is possible to remove interference waves with a main lobe of antenna directivity pointed to a target desired wave and a null point (depressed point of directional pattern of antenna) pointed to the direction of unnecessary interference waves, it is necessary to weight a transmission signal to each antenna and a received signal from each antenna. It is also necessary to calculate weighting factors and multiply transmission/received signals by complex weighting factors, which causes the circuit scale to increase.

On the contrary, the RFID data collecting device according to the second invention places, for example, arranging planar inverted-F antennas on the same plane at a predetermined relative angle allows to steepen directivity of the planar inverted-F antennas without calculating weighting factors and multiplying the transmission/received signals by complex weighting factors.

(3)

An RFID data collecting device according to a third invention is the RFID data collecting device according to the one aspect, in which the RFID reader may transmit/receive radio waves from the plurality of antennas connected to the plurality of ports and the plurality of antennas may be arranged so as not to interfere with each other.

According to the second invention, the plurality of antennas are arranged on the same plane at a predetermined relative angle to each other, and thereby the antennas are allowed to function as one antenna provided with steep directivity. However, according to the third invention, the plurality of antennas are arranged so as not to interfere with each other so that the respective antennas can transmit/receive radio waves to/from different RFID tags.

The RFID data collecting device may require, for example, communication with RFID tags arranged in a plurality of shelves. In that case, the RFID data collecting device according to the third invention arranges the plurality of antennas so as not to interfere with each other and communicates with RFID tags arranged on the respective shelves via the respective antennas, and can thereby reliably collect data of more RFID tags.

(4)

An RFID data collecting device according to a fourth invention is the RFID data collecting device according to the first aspect, in which the system control unit may operate on a Linux (registered trademark) operating system and may transmit collected information of RFID tags to an external personal computer or portable information terminal.

In this case, since the system control unit operates on the Linux (registered trademark) operating system, rich libraries that operates on the Linux (registered trademark) operating system can be used.

(5)

An RFID data collecting device according to a fifth invention is the RFID data collecting device according to the first aspect that may further include a Bluetooth (registered trademark) connection unit, an RS232C connection unit, a USB connection unit, a general-purpose input/output unit and an SD card connection unit.

In this case, it is possible to perform communication with a equipment provided with the Bluetooth (registered trademark) connection unit, communication with a equipment provided with the RS232C connection unit, communication with a equipment provided with the USB connection unit, direct digital control on an external equipment via the general-purpose input/output unit, and saving data in a USB memory or an SD card or the like.

(6)

An RFID data collection system according to a sixth invention may include one or a plurality of RFID data collecting devices according to the first aspect and a personal computer or a portable information terminal that receives data of RFID tags collected by the RFID data collecting devices or transmits data to the RFID tags via the RFID data collecting devices.

In this case, collecting data to the personal computer or the portable information terminal facilitates an analysis or the like of large volume data and collecting data of RFID tags via the plurality of RFID data collecting devices makes it possible to construct a larger-scale data collection system.

DESCRIPTION OF EMBODIMENTS

Figure 1:
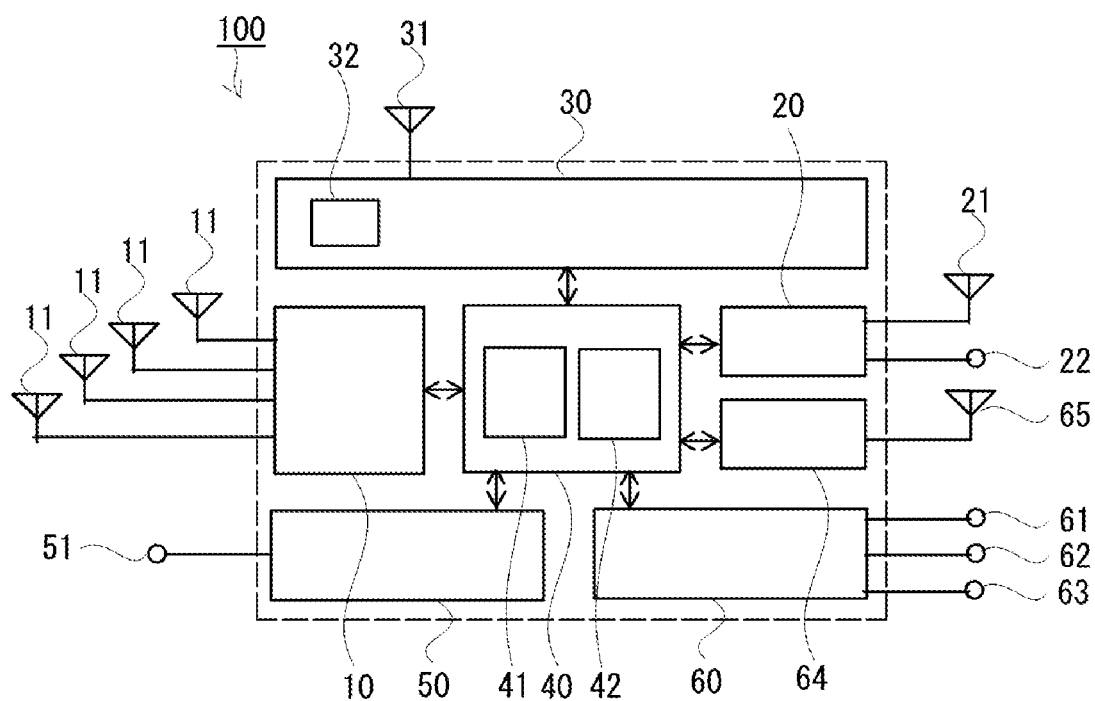
FIG. 1 is a schematic block diagram illustrating a configuration of an RFID data collecting device according to a first embodiment.

Hereinafter, embodiments of the present invention will be described with reference to the accompanying drawings. In the following description, the same parts are assigned the same reference numerals. In the case of the same reference numerals, their names and functions are also the same. Therefore, detailed description thereof will not be repeated.

First Embodiment

FIG. 1 is a schematic block diagram of an RFID data collecting device 100 of a first embodiment.

Figure 2A:
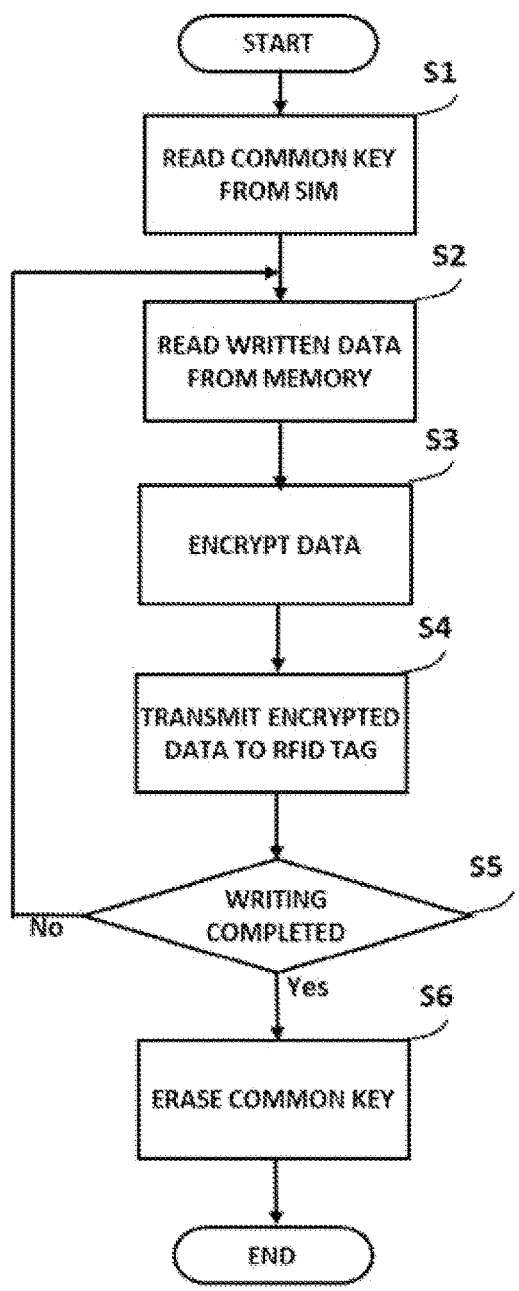
FIG. 2(a) is a flowchart when the RFID data collecting device writes data to an RFID tag and FIG. 2(b) is a flowchart when the RFID data collecting device reads data from an RFID tag.

FIG. 2(a) is a flowchart in the case of data written to an RFID tag 80 of an RFID data collecting device 100.

Figure 2B:
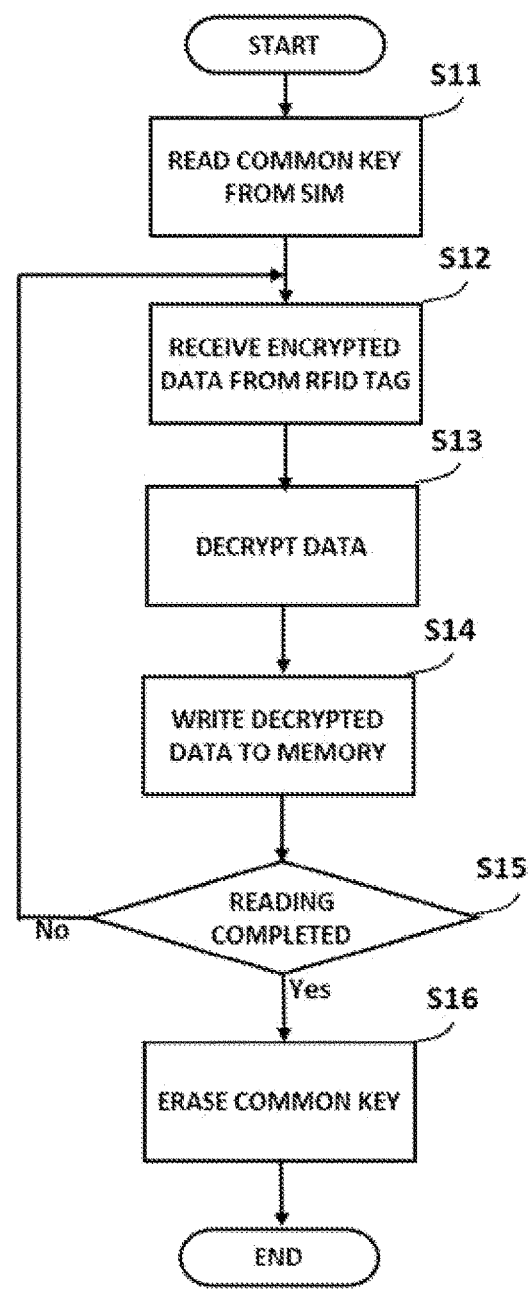

FIG. 2(b) is a flowchart in the case of data read from the RFID tag 80 of the RFID data collecting device 100.

In FIG. 1, the RFID data collecting device 100 includes an RFID reader 10 provided with a plurality of connection ports connected to RFID reader antennas 11 and a wired/wireless LAN connection unit 20 provided with a terminal for connection with a wireless LAN antenna 21 and an Ethernet (registered trademark) connection terminal 22.

Furthermore, the RFID data collecting device 100 includes a portable telephone communication unit 30 provided with a terminal for connection with a portable telephone communication antenna 31 and a SIM card 32, a system control unit 40 provided with a processor 41 and a memory 42 and a general-purpose input/output unit 50 provided with an input/output terminal 51.

The RFID data collecting device 100 further includes a USB/RS232C/SD card connection unit 60 provided with a USB connection terminal 61, an RS232C connection terminal 62 and an SD card connection terminal 63, a Bluetooth (registered trademark) connection unit 64 provided with a terminal for connection with a Bluetooth (registered trademark) communication antenna 65.

The system control unit 40 of the RFID data collecting device 100 encrypts data under remote control from a personal computer 70 or a portable information terminal 71 and transmits the encrypted data to the RFID tag 80. Alternatively, the system control unit 40 receives the encrypted data from the RFID tag 80 and decrypts the encrypted data.

The system control unit 40 in FIG. 1 is provided with the processor 41 that operates on a Linux (registered trademark) operating system. In this case, since the system control unit 40 operates on the Linux (registered trademark) operating system, it is possible to use rich libraries operating on the Linux (registered trademark) operating system.

For example, openssl (encryption software) can be used easily.

Furthermore, the RFID data collecting device 100 can be connected to various external devices and external memories via the general-purpose input/output unit 50, the USB/RS232C/SD card connection unit 60 and the Bluetooth (registered trademark) connection unit 64.

FIG. 2(a) illustrates a flowchart in the case of data written to the RFID tag 80 and FIG. 2(b) illustrates a flowchart in the case of data read from the RFID tag 80.

In the case of data written to the RFID tag 80, the system control unit 40 reads a common key from the SIM card 32 of the portable telephone communication unit 30 (S1).

Next, the write data saved in the memory 42 of the system control unit 40 is read (S2). The data is then encrypted using the common key (S3). Next the encrypted data is transmitted from the RFID reader 10 to the RFID tag 80 (S4).

An encryption scheme is not particularly limited as long as it is an encryption scheme according to a common key scheme, but, for example, Advanced Encryption Standard (AES) having a block length of 128 bits and a key length of 128 bits is suitable.

In encryption, a block length is normally fixed and if the writing to the RFID tag 80 has not ended yet after transmission of one block, the process is returned to the reading of the write data (S5). If the writing to the RFID tag 80 has ended, the process ends after erasing the common key (S6).

Similarly, in the case of reading data from the RFID tag 80, the common key is read from the SIM card 32 of the portable telephone communication unit 30 (S11).

Next, encrypted data is received from the RFID tag 80 (S12). The data is then decrypted using the common key (S13) and the decrypted read data is saved in the memory 42 (S14). After that, if the reading has not ended, the process is returned to the step of receiving data from the RFID tag 80 (S15). If the reading from the RFID tag 80 has ended, the process ends after erasing the common key (S16).

The RFID data collecting device 100 of the first embodiment is provided with a plurality of ports for the RFID reader 10 to be connected to the plurality of antennas 11, and can thereby communicate with more RFID tags 80. Even when there is only one antenna 11, the RFID reader 10 can still communicate with the plurality of RFID tags 80. However, if the distance between the antenna 11 and the RFID tag 80 is large or when there is an obstacle 82 such as a metal plate between the antenna 11 and the RFID tag 80, the RFID reader 10 cannot communicate with the RFID tag 80. In contrast, in the case of the RFID data collecting device 100 of the first embodiment, the RFID reader 10 is provided with a plurality of ports, the RFID data collecting device 100 can increase a distance D among the plurality of antennas 11 as needed or arrange the plurality of antennas 11 on both sides of the obstacle 82, and thereby communicate with more RFID tags 80 (see FIG. 6 as well).

The RFID data collecting device 100 of the first embodiment is provided with not only the wired/wireless LAN connection unit 20 but also the portable telephone communication unit 30. For that reason, even when there is no environment in which wired LAN or wireless LAN can be connected, the portable information terminal 71 (smartphone or the like) can remotely control the RFID data collecting device 100.

Since the RFID data collecting device 100 of the first embodiment encrypts communication information between the RFID reader 10 and the RFID tag 80, even when the communication information between the RFID reader 10 and the RFID tag 80 is intercepted, information written to the RFID tag 80 or information read from the RFID tag 80 will not be stolen.

Furthermore, the RFID data collecting device 100 of the first embodiment can save an encryption key in the highly confidential SIM card 32 and strictly store the SIM card 32. For example, even if the RFID data collecting device 100 is stolen, the encryption key will not be gone into the hands of others and the data recorded in the RFID tag 80 can be read using another RFID data collecting device 100.

As the antenna 11 to be connected to the RFID reader 10 of the RFID data collecting device 100 of the first embodiment, a dipole antenna or a patch antenna can be used in addition to a planar inverted-F antenna (PIFA), which will be described later.

Second Embodiment

In an RFID data collecting device 100 according to a second embodiment, two planar inverted-F antennas (PIFA) 11 connected to the RFID reader 10 are arranged on the same plane at a relative angle θ.

Figure 3A:
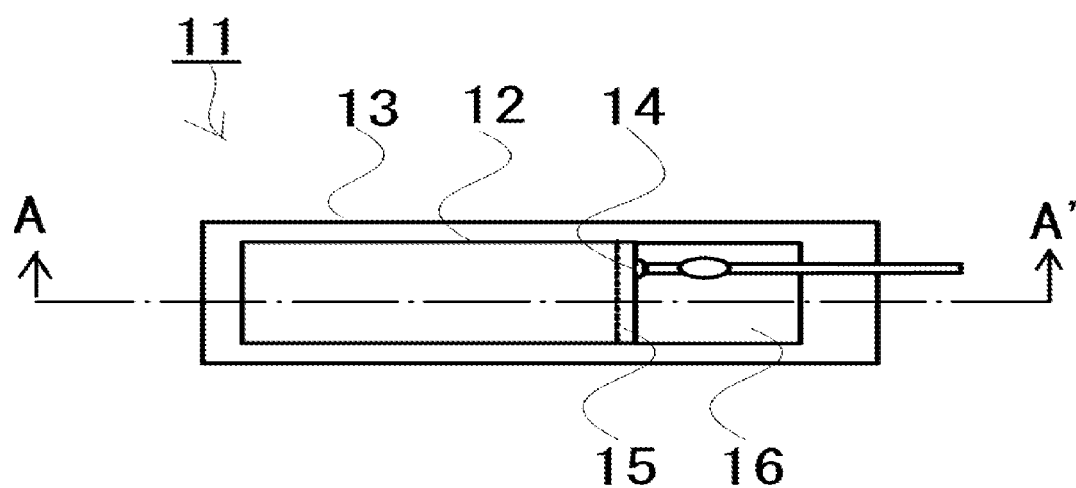
FIG. 3(a) is a schematic top view of a planar inverted-F antenna (PIFA) connected to an RFID reader of an RFID data collecting device according to a second embodiment and FIG. 3(b) is a schematic cross-sectional view of the antenna connected to the RFID reader along an A-A' plane in FIG. 3(a).
Figure 3B:
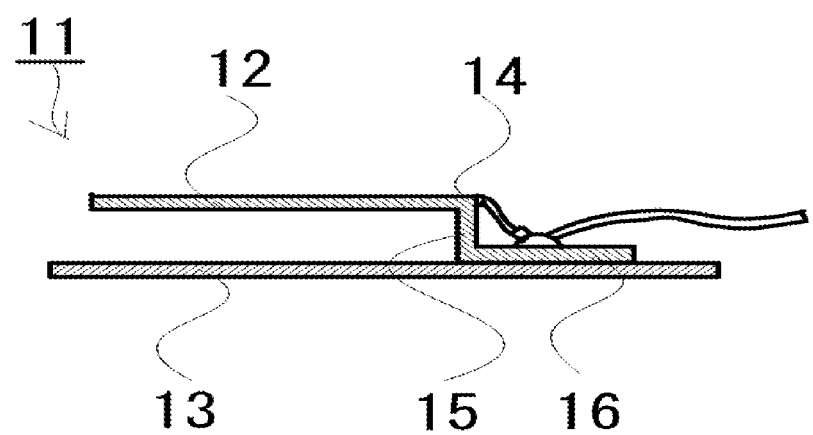
Figure 4:
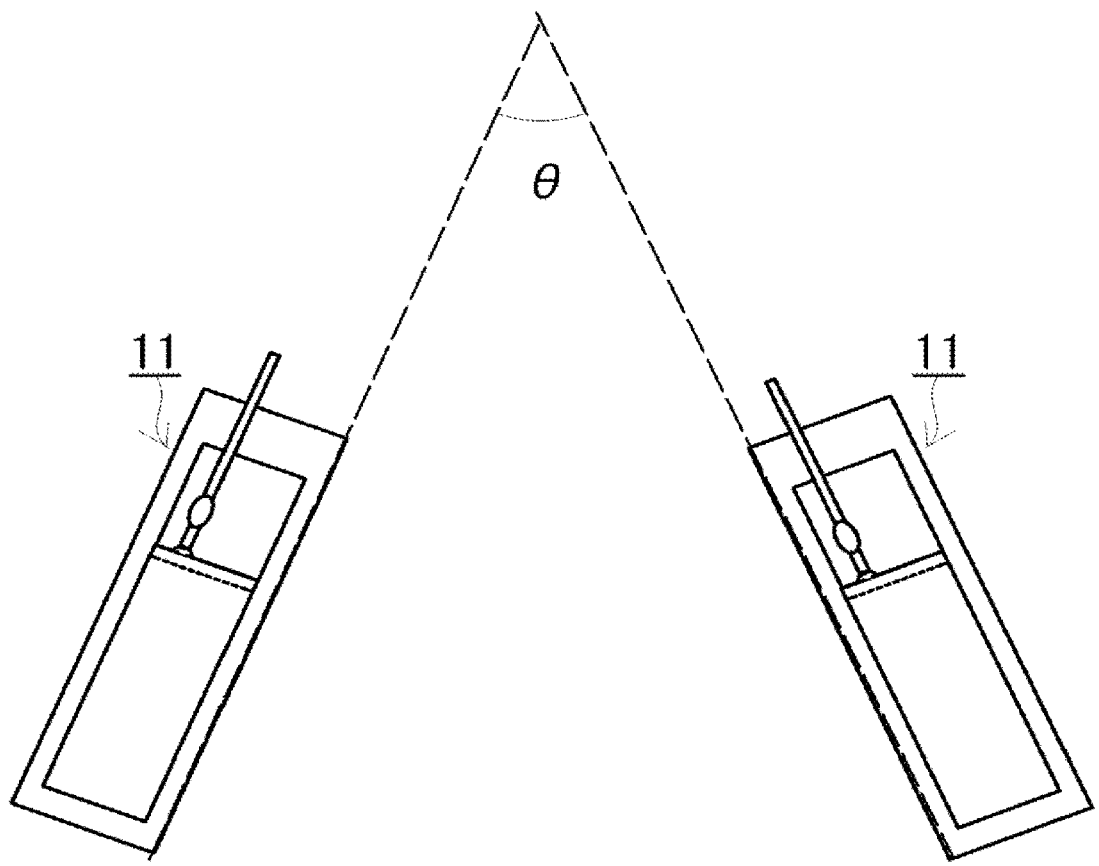
FIG. 4 is a schematic top view when two planar inverted-F antennas (PIFA) connected to the RFID reader are arranged on the same plane at a relative angle θ.
Figure 5:
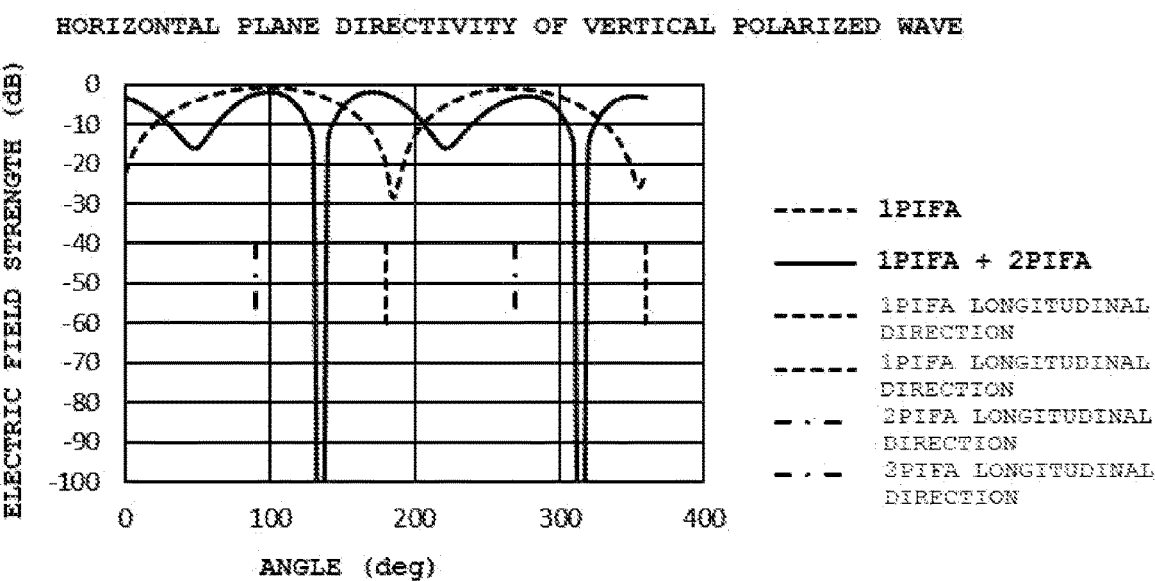
FIG. 5 is a graph illustrating directivity of a vertical polarized wave on a plane when two planar inverted-F antennas (PIFA) are arranged on the same plane at a relative angle 90 degrees.

FIG. 3 illustrates a schematic top view and a schematic cross-sectional view of the planar inverted-F antenna (PIFA) 11 connected to the RFID reader 10 of the RFID data collecting device 100 of the second embodiment. FIG. 4 illustrates a schematic top view when the two antennas 11 are arranged on the same plane at a relative angle θ. FIG. 5 illustrates simulation results of directivity of vertical polarized waves on a plane when the planar inverted-F antennas (PIFA) are arranged on the same plane at a relative angle of 90 degrees as an example of the RFID data collecting device 100 of the second embodiment.

FIG. 3($a$) is a schematic top view of the planar inverted-F antenna (PIFA) 11 connected to the RFID reader 10 of the RFID data collecting device 100 of the second embodiment.

FIG. 3($b$) is a schematic cross-sectional view of the antenna 11 connected to the RFID reader 10 on an A-A' plane in FIG. 3($a$). The antenna 11 includes a ground plate 13 and a radiation plate 12 placed at a predetermined distance from the ground plate 13. The ground plate 13 is formed in a rectangular shape in size larger than the radiation plate 12 in a plan view.

In FIG. 3, the radiation plate 12, a short circuit unit 15 and a fixing unit 16 are formed by folding a rectangular metal plate and the fixing unit 16 can be fixed to the ground plate 13 using a publicly known fixing member such as a screw, bolt and nut or soldering. The antenna 11 is connected to a port of the RFID reader 10 using a coaxial cable, and a signal line of the coaxial cable is connected to a power feeding unit 14 and the ground line is connected to the fixing unit 16.

In the RFID data collecting device 100 of the second embodiment, two antennas 11 which are planar inverted-F antennas (PIFA) described in FIG. 3 are connected to the RFID reader 10 and the two antennas 11 are arranged on the same plane at the predetermined relative angle θ to each other.

FIG. 4 illustrates a schematic top view when the two antennas 11 are arranged on the same plane at the relative angle θ. The two antennas 11 are connected to different ports of the RFID reader 10, the same signals are supplied to the power feeding units 14 of the respective antennas 11 in the case of transmission and received signals of the respective antennas 11 are added and combined in the RFID reader 10 in the case of reception.

As a transmission/reception method using the plurality of antennas 11, an array antenna or an adaptive array antenna is available.

In this case, the following advantageous effects are obtained. That is, the array antenna is able to point a main lobe of antenna directivity to a target desired wave, point a null point (depressed point of a directional pattern of the antenna) to a direction of an unnecessary interference wave and remove the interference wave. However, a transmission signal to each antenna 11 and a received signal from each antenna 11 need to be weighted. In that case weighting factors need to be calculated. Furthermore, a transmission or received signal needs to be multiplied by complex weighting factors, which leads to an increase in a circuit scale.

In contrast to this, the RFID data collecting device 100 of the second embodiment can steepen directivity of the antenna 11 while keeping the circuit scale small. For example, by arranging the planar inverted-F antennas on the same plane at the predetermined relative angle θ, it is possible to steepen directivity of the antenna 11 without the need to calculate the weighting factors and multiply the transmission/received signal by complex weighting factors.

FIG. 5 illustrates simulation results of directivity of a vertical polarized wave on a plane when the planar inverted-F antennas (PIFA) are arranged on the same plane with the relative angle θ set to 90 degrees as an example of the RFID data collecting device 100 of the second embodiment.

A directivity graph with a dotted line in the diagram shows directivity in a case where there is one planar inverted-F antenna and a directivity graph with a solid line shows directivity in a case where two planar inverted-F antennas are arranged on the same plane at a relative angle of 90 degrees. Dotted vertical lines (180 degrees, 360 degrees) show longitudinal directions of a first PIFA (1PIFA) of the two PIFAs and single-dot dashed vertical lines (90 degrees, 270 degrees) show longitudinal directions of a second PIFA (2PIFA).

As for directivity of a vertical polarized wave on a plane when there is one planar inverted-F antenna, electric field strength tends to decrease along the longitudinal direction of the planar inverted-F antenna. In contrast to this, when two planar inverted-F antennas are arranged on the same plane at a relative angle of 90 degrees, there are null points in directions just in the middle (135 degrees, 225 degrees) of the longitudinal directions of the two planar inverted-F antennas. And interference waves coming from these directions can be removed.

FIG. 5 shows the case where the antennas are arranged on the same plane with the relative angle θ set to 90 degrees, but setting the relative angle to 45 degrees may be effective in actual use.

In addition, the relative angle θ may be set to any angle within a range of 40 to 100 degrees.

Third Embodiment

Figure 6A:
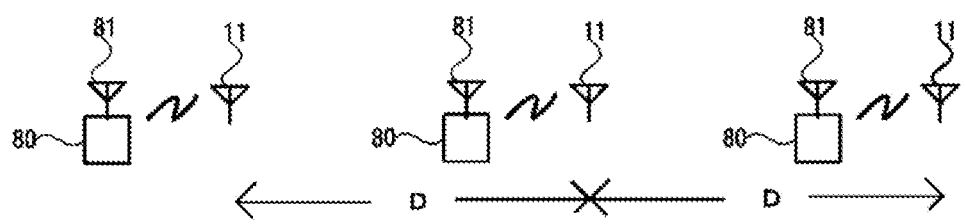
FIG. 6(a) to FIG. 6(c) illustrate schematic views of antenna arrangement examples of an RFID data collecting device according to a third embodiment.
Figure 6B:
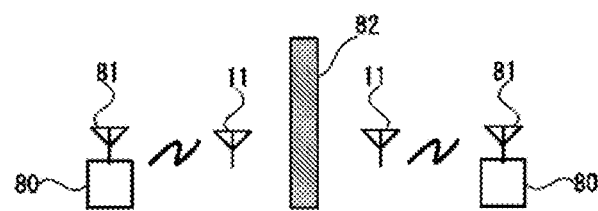
Figure 6C:
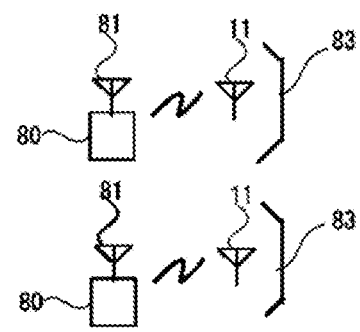

FIG. 6(*a*) to FIG. 6(*c*) illustrate arrangement examples of the antennas 11 of an RFID data collecting device 100 according to a third embodiment.

In the RFID data collecting device 100 of the third embodiment, a plurality of antennas 11 are arranged so as to allow the respective antennas 11 to transmit/receive radio waves to/from different RFID tags 80.

In FIG. 6(*a*), the plurality of antennas 11 are arranged by being spaced apart from each other by a predetermined distance D to make distances from their respective RFID tags 80 as uniform as possible. By this arrangement the antennas 11 may carry out stable communication with more RFID tags 80.

In FIG. 6(*b*), the antennas 11 are arranged with an obstacle 82 such as a shelf or a partition in between and the plurality of antennas 11 are arranged at positions where the antennas 11 can see through their respective RFID tags 80 to carry out stable communication with more RFID tags 80.

In FIG. 6(*c*), directivity of the antenna 11 can be improved by placing, for example, a reflection plate 83 behind each antenna 11. Furthermore, the antenna 11 can carry out stable communication with more RFID tags 80 by improving directivity and then arranging the respective RFID tags 80 in directions in which the antennas 11 show high directivity.

Thus, in order to carry out stable communication with more RFID tags 80 via the plurality of antennas 11, it is important that the plurality of antennas 11 should be arranged so as not to interfere with each other by widening the distance D among the plurality of antennas 11, arranging the antennas 11 with the obstacle 82 in between or using the antennas 11 with high directivity and arranging the RFID tags 80 in directions in which the antennas 11 show high electric field strength.

Fourth Embodiment

Figure 7:
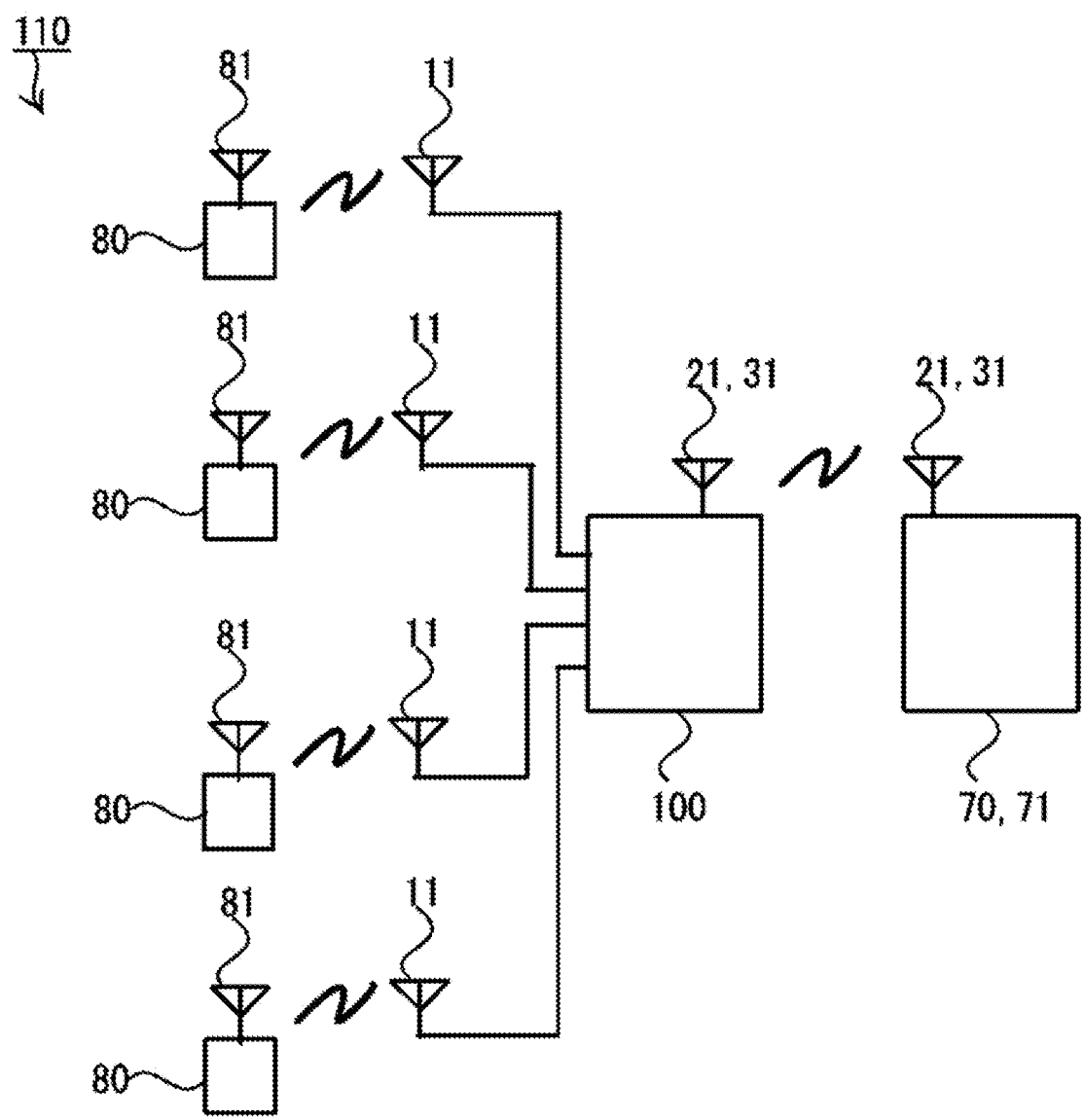
FIG. 7 is a schematic block diagram of an RFID data collection system according to a fourth embodiment constructed of an RFID data collecting device, a plurality of antennas and a personal computer or a portable information terminal.

FIG. 7 is a block diagram of an RFID data collection system 110 according to a fourth embodiment.

As shown in FIG. 7, the RFID data collection system 110 is constructed of an RFID data collecting device 100, a plurality of antennas 11, a personal computer 70 or a portable information terminal 71 and a wireless LAN antenna 21 or a portable telephone communication antenna 31.

The RFID data collection system 110 encrypts data using a common key saved in the SIM card 32 of the RFID data collecting device 100 under remote control from the personal computer 70 or the portable information terminal 71 and transmits the encrypted data to the RFID tags 80. Alternatively, the RFID data collection system 110 receives the encrypted data from the RFID tags 80 and decrypts the data using the common key saved in the SIM card 32.

Note that although each antenna 11 is described as to wirelessly communicate with one RFID tag 80 in FIG. 7, each antenna 11 can communicate with the plurality of RFID tags 80. Furthermore, although the RFID data collection system 110 includes one RFID data collecting device 100 in FIG. 7, one RFID data collection system 110 may include a plurality of RFID data collecting devices 100 and one personal computer 70 or portable information terminal 71 may control the plurality of RFID data collecting devices 100.

Collecting data of the RFID tag 80 in the personal computer 70 or the portable information terminal 71 facilitates analysis or the like of a large amount of data and collecting data of the RFID tag 80 via the plurality of RFID data collecting devices 100 can construct a larger-scale data collection system.

In the present invention, the RFID reader 10 corresponds to an "RFID reader," the wired/wireless LAN connection unit 20 corresponds to a "wired/wireless LAN connection unit," the portable telephone communication unit 30 corresponds to a "portable telephone communication unit," and the antenna 11 corresponds to an "antenna." The processor 41 corresponds to a "processor," the system control unit 40 corresponds to a "system control unit," and the RFID tag 80 corresponds to an "RFID tag." The SIM card 32 corresponds to a "SIM card," the RFID data collecting device 100 corresponds to an "RFID data collecting device," the personal computer 70 corresponds to a "personal computer," and the portable information terminal 71 corresponds to a "portable information terminal." Furthermore, the Bluetooth (registered trademark) connection unit 64 corresponds to a "Bluetooth (registered trademark) connection unit," the USB/RS232C/SD card connection unit 60 corresponds to a "USB connection unit," an "RS232C connection unit" and an "SD-card connection unit," the general-purpose input/output unit 50 corresponds to a "general-purpose input/output unit" and the RFID data collection system 110 corresponds to an "RFID data collection system."

Although the preferable embodiments of the present invention are as described above, the present invention is not limited to these embodiments alone. It will be understood that various other embodiments may be implemented without departing from the spirit and scope of the present invention. Furthermore, although operations and effects according to the configuration of the present invention have been mentioned in the present embodiments, these operations and effects are just examples, and are not intended to limit the present invention.

REFERENCE SIGNS LIST

10 RFID reader
11 antenna
20 wired/wireless LAN connection unit
30 portable telephone communication unit
32 SIM card
40 system control unit
41 processor
50 general-purpose input/output unit
60 USB/RS232C/SD card connection unit
64 Bluetooth (registered trademark) connection unit
70 personal computer
71 portable information terminal
80 RFID tag
100 RFID data collecting device
110 RFID data collection system

What is claimed is:

1. An RFID data collecting device comprising:
an RFID reader provided with a plurality of ports;
one or a plurality of antennas connected to the plurality of ports;
a wired/wireless LAN connection unit;
a portable telephone communication unit; and
a system control unit comprising a processor, wherein
the system control unit writes data to an RFID tag and reads data from the RFID tag via the RFID reader by remote control,
the system control unit comprises an encryption/decryption function according to a common key scheme,
the data written to the RFID tag is encrypted before being written,
the data read from the RFID tag is decrypted after being read, and
the common key for encryption/decryption is saved in a SIM card provided in the portable telephone communication unit.

2. The RFID data collecting device according to claim 1, wherein
the plurality of antennas are planar inverted-F antennas, placed on a same plane at a predetermined relative angle to each other, and
the RFID reader transmits the same signals from the plurality of antennas connected to the plurality of ports when transmitting radio waves, and adds and combines received signals of the plurality of antennas when receiving radio waves.

3. The RFID data collecting device according to claim 1, wherein the RFID reader transmits/receives radio waves from the plurality of antennas connected to the plurality of ports and the plurality of antennas are arranged so as not to interfere with each other.

4. The RFID data collecting device according to claim 1, wherein the system control unit operates on a Linux (registered trademark) operating system and transmits collected information of the RFID tags to an external personal computer or a portable information terminal.

5. The RFID data collecting device according to claim 1, further comprising:
a Bluetooth (registered trademark) connection unit;
an RS232C connection unit;
a USB connection unit;
a general-purpose input/output unit; and
an SD card connection unit.

6. An RFID data collection system comprising:
the one or a plurality of RFID data collecting devices according to claim 1; and
a personal computer or a portable information terminal that receives data of the RFID tags collected by the RFID data collecting devices or transmits data to the RFID tags via the RFID data collecting devices.

* * * * *